United States Patent
Bour et al.

(10) Patent No.: US 7,443,561 B2
(45) Date of Patent: Oct. 28, 2008

(54) DEEP QUANTUM WELL ELECTRO-ABSORPTION MODULATOR

(75) Inventors: David P. Bour, Cupertino, CA (US); Ashish Tandon, Sunnyvale, CA (US); Michael R. T. Tan, Menlo Park, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 170 days.

(21) Appl. No.: 11/148,467

(22) Filed: Jun. 8, 2005

(65) Prior Publication Data
US 2006/0279828 A1    Dec. 14, 2006

(51) Int. Cl.
*G02F 1/03*    (2006.01)
*H01L 29/06*    (2006.01)
*H01S 5/00*    (2006.01)

(52) U.S. Cl. .................. 359/241; 257/18; 372/45.01
(58) Field of Classification Search ......... 359/240–241, 359/245, 248; 372/45.01, 45.011, 7, 11, 372/18, 43, 45, 48, 68, 75; 257/18, 14–15, 257/189, 622–623; 385/2, 14, 131
See application file for complete search history.

(56) References Cited

U.S. PATENT DOCUMENTS

| | | | |
|---|---|---|---|
| 5,048,036 A | 9/1991 | Scifres et al. | |
| 5,172,384 A | 12/1992 | Goronkin et al. | |
| 5,286,982 A | 2/1994 | Ackley et al. | |
| 5,425,042 A | 6/1995 | Nido et al. | |
| 5,506,418 A * | 4/1996 | Bois et al. ...................... | 257/15 |
| 5,671,242 A | 9/1997 | Takiguchi et al. | |
| 5,719,895 A | 2/1998 | Jewell et al. | |
| 5,724,174 A | 3/1998 | Meyer et al. | |
| 5,937,274 A * | 8/1999 | Kondow et al. ............... | 438/47 |
| 5,953,479 A | 9/1999 | Zhou et al. | |
| 7,030,415 B2 | 4/2006 | Lee | |
| 2002/0079485 A1 * | 6/2002 | Stintz et al. .................... | 257/14 |
| 2005/0199870 A1 | 9/2005 | Gray et al. | |
| 2006/0083278 A1 | 4/2006 | Tan et al. | |
| 2006/0157685 A1 * | 7/2006 | Ponomarev .................. | 257/14 |

FOREIGN PATENT DOCUMENTS

WO    WO 02/061499    8/2002

OTHER PUBLICATIONS

U.S. Appl. No. 11/148,467, filed Jun. 8, 2005, David P. Bour et al.

* cited by examiner

*Primary Examiner*—Scott J. Sugarman
*Assistant Examiner*—Dawayne A Pinkney

(57) ABSTRACT

Double well structures in electro-absorption modulators are created in quantum well active regions by embedding deep ultra thin quantum wells. The perturbation introduced by the embedded, deep ultra thin quantum well centered within a conventional quantum well lowers the confined energy state for the wavefunction in the surrounding larger well and typically results in the hole and electron distributions being more confined to the center of the conventional quantum well. The extinction ratio provided by the electro-absorption modulator is typically increased.

20 Claims, 6 Drawing Sheets

U.S. 7,443,561 B2 …

DEEP QUANTUM WELL ELECTRO-ABSORPTION MODULATOR

BACKGROUND

Electro-absorption modulators are used to modulate light in optical telecommunications applications. Typically, an electro-absorption modulator modulates light generated by a continuous light source. The electro-absorption modulator typically modulates light by either allowing or preventing light from passing through the electro-absorption modulator. One of the main parameters that characterize the light modulation performance of an electro-absorption modulator is the extinction ratio. The extinction ratio is the ratio of the maximum power output to the minimum power output of the electro-absorption modulator. A higher extinction ratio is typically the result of a higher absorption of light through the creation of more electron-hole pairs in the active layer.

Electro-absorption modulators capable of operating at data rates on the order of 40 Gb/s are of interest for optical telecommunications applications. Electro-absorption modulators are typically based on the quantum-confined Stark effect. Applying an electric field across the quantum well structure changes the effective band gap energy of the quantum well structure through the quantum-confined Stark effect. Electro-absorption modulators absorb light when a reverse bias is applied to the p-i-n junction. Because little current flows when the reverse bias is applied, the modulation speed is limited by the time required to charge and discharge the capacitance of the electro-absorption modulator.

There are a number of tradeoffs associated with multiple quantum well design of electro-absorption modulators and the impact on performance parameters. Overall electro-absorption modulator design and operation typically represents a tradeoff among limitations. A higher extinction ratio may be achieved by increasing absorption through longer modulators, more quantum wells or higher voltage swing operation. However, the modulation rate is adversely effected because longer modulators result in higher capacitance and increasing the number of quantum wells increases carrier extraction time.

As noted, typical electro-absorption modulators are operated under reverse bias which results in an applied electric field that causes a separation in the electron and hole wavefunctions where the hole distribution is distributed toward the p-doped side and the electron distribution is distributed toward the n-doped side of the quantum well. This physical separation between photogenerated carriers translates into reduced absorption which reduces the extinction ratio compared to that obtained if overlap between hole and electron wavefunction is maintained. FIG. 1 shows this effect by examining the photocurrent absorption spectra at room temperature for an eight quantum well InGaAsP modulator. Curve 101 shows a nearly ideal photocurrent absorption spectrum at zero reverse bias, a sharp bandedge transition at λ~1490 nm, along with an excitonic absorption resonance. As the reverse bias is increased to about 1.25 volts as shown by curve 105, to about 2.5 volts as shown by curve 110 and to about 3.75 volts as shown by curve 115, the absorption edge shifts to longer wavelengths because of the quantum-confined Stark effect. The absorption decreases in magnitude as the reverse bias is increased due to the increasing separation between the hole and electron distribution in the quantum well regions.

SUMMARY OF INVENTION

In accordance with the invention, double well structures in electro-absorption modulators are created in quantum well active regions by embedding deep ultra thin quantum wells. The perturbation introduced by the embedded, deep ultra thin quantum well centered within a conventional quantum well lowers the confined energy state for the wavefunction in the surrounding larger well and typically results in the hole and electron distributions being more confined to the center of the conventional quantum well. The resulting increase in spatial overlap of the hole and electron wavefunctions increases the quantum well absorption. Hence, the extinction ratio provided by the electro-absorption modulator is typically increased.

DETAILED DESCRIPTION

Figure 2A:
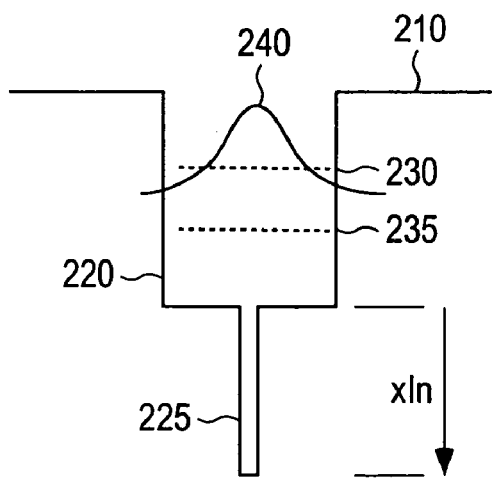
FIG. 2a shows a composition profile for a quantum well in accordance with the invention.

FIG. 2a shows a composition profile for a quantum well of an embodiment in accordance with the invention. GaAs barrier layer 210 provides the reference level of zero indium content at the top of InGaAs quantum well 220. InGaAs quantum well 220 is a highly strained quantum well in which embedded, deep, ultra-thin quantum well 225 is embedded into InGaAs quantum well 220 to make a subwell. Quantum well 220 is typical of quantum wells used on GaAs. The perturbation introduced by embedded, deep, ultra-thin quantum well 225 lowers confined energy state 230 of wavefunction 240 in quantum well 220 to confined energy state 235. A composition for embedded, deep, ultra-thin quantum well 225 is typically of the form $In_xGa_{(1-x)}As$ given a typical composition for quantum well 220 of $In_yGa_{(1-y)}As$ where y is typically in the range of about 0.35 to 0.4. The value of y is typically selected to achieve the longest wavelength possible from quantum well 220 without the addition of embedded, deep ultra-thin quantum well 225.

Figure 2B:
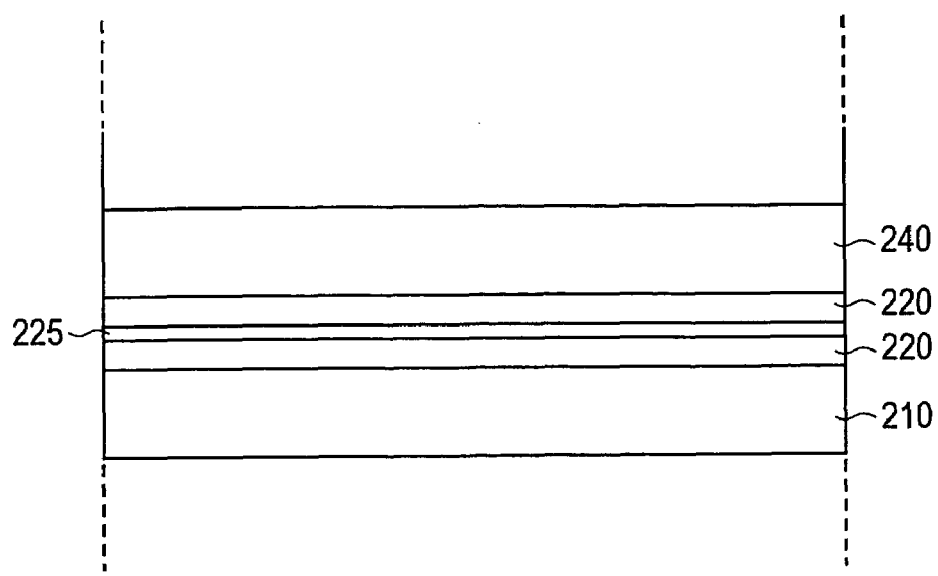
FIG. 2b shows a layer structure corresponding to FIG. 2a in accordance with the invention.

FIG. 2b shows a layer structure corresponding to the quantum well composition profile of FIG. 2a. Highly strained InGaAs quantum well layer 220 is grown on GaAs barrier layer 210, typically to a total thickness of about 60 angstrom. After the first approximately 30 angstrom of InGaAs quantum well layer 220 is grown, embedded, deep, ultra-thin $In_xGa_{(1-x)}As$ quantum well layer 225 is typically grown to a thickness of about 10 angstrom and growth is typically chosen to maintain a coherent layer so that embedded, deep, ultra-thin thin $In_xGa_{(1-x)}As$ quantum well layer 225 is also highly strained. Surfactants such as antimony may be introduced to allow for coherent growth of the quantum well layer or multiple quantum well stack. Introduction of antimony prevents relaxation of the overall quantum well structure by improving the mobility of the indium atoms during MOCVD surface reconstruction. Following growth of embedded, deep, ultra-thin thin $In_xGa_{(1-x)}As$ quantum well layer 220, growth of the remaining approximately 30 angstrom of highly strained InGaAs quantum well layer 220 is completed. GaAs barrier layer 241 is then grown over highly strained InGaAs quantum well layer 120.

Figure 2C:
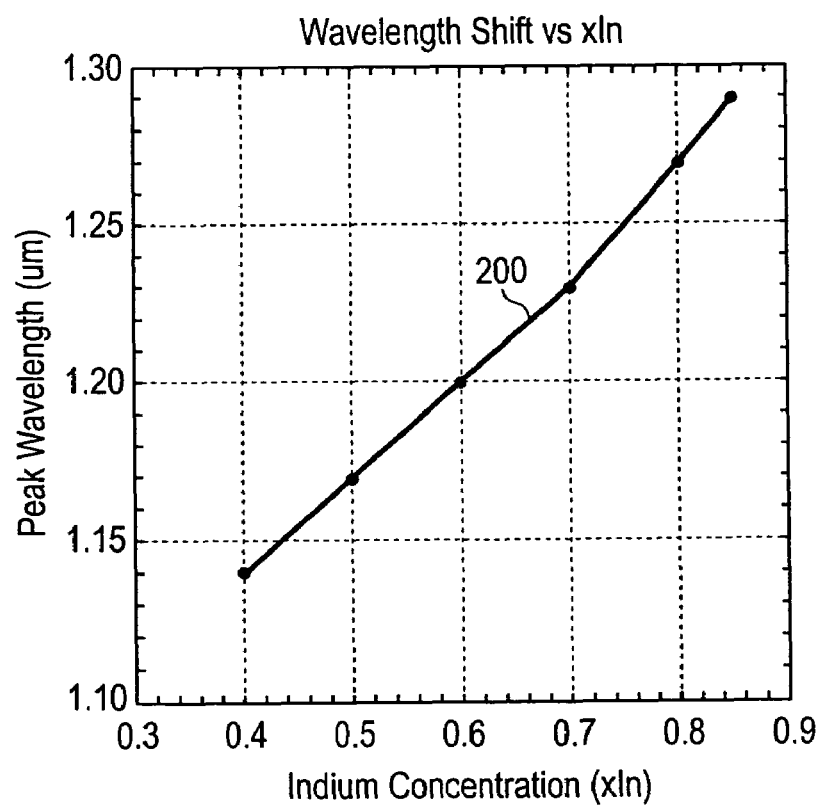
FIG. 2c shows the shift of wavelength with indium concentration in accordance with the invention.

Plot 200 in FIG. 2c shows the shift in wavelength versus indium composition of embedded, deep, ultra-thin $In_xGa_{(1-x)}As$ quantum well layer 225 having a thickness of about 10 angstrom for x in the range from about 0.4 to about 0.85. $In_yGa_{(1-y)}As$ quantum well layer 220 is about 60 angstroms thick where y is about 0.4. The unperturbed quantum well layer without embedded deep, ultra-thin $In_xGa_{(1-x)}As$ quantum well layer 225 corresponds to a 70 angstrom thick $In_yGa_{(1-y)}As$ quantum well layer with y about 0.4 with an absorption wavelength of about 1140 nm at zero reverse bias. As seen from plot 200 in FIG. 2c, the absorption wavelength at zero reverse bias shifts approximately linearly with indium concentration at a rate of approximately 30 nm for a 0.1 increase in indium composition for x above a value of about 0.4. At an indium composition of 0.8, the absorption wavelength at zero reverse bias has been increased to about 1270 nm.

Figure 1:
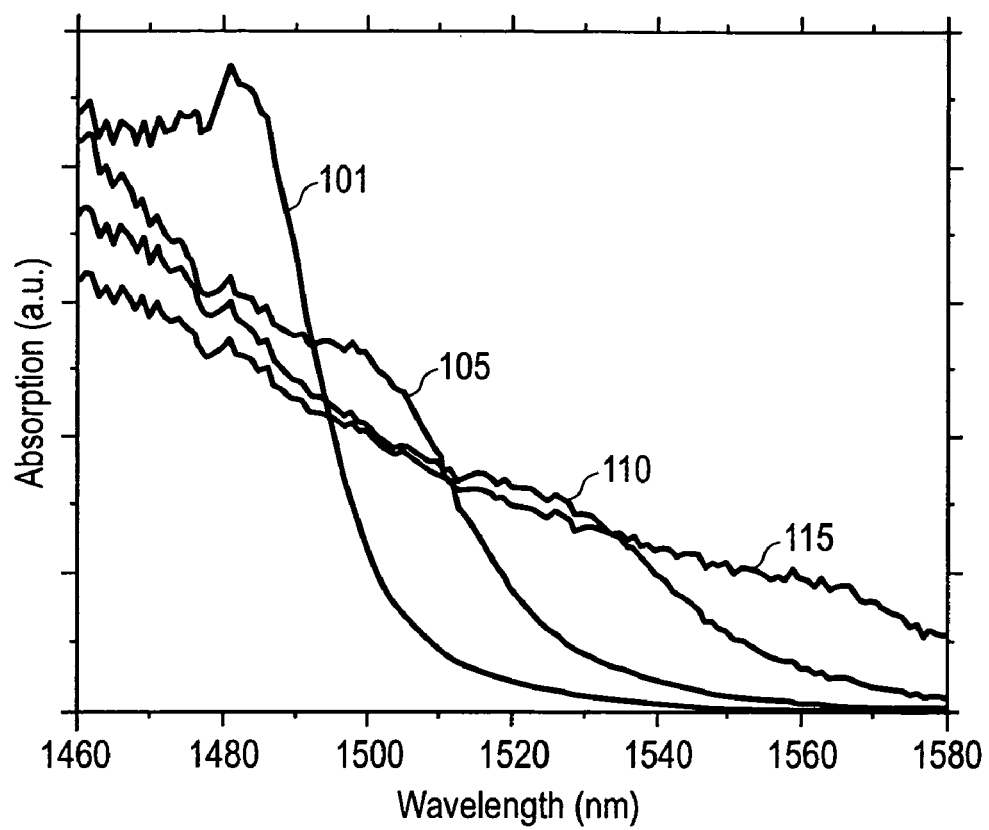
FIG. 1 shows absorption versus wavelength for different values for the reverse bias.
Figure 3A:
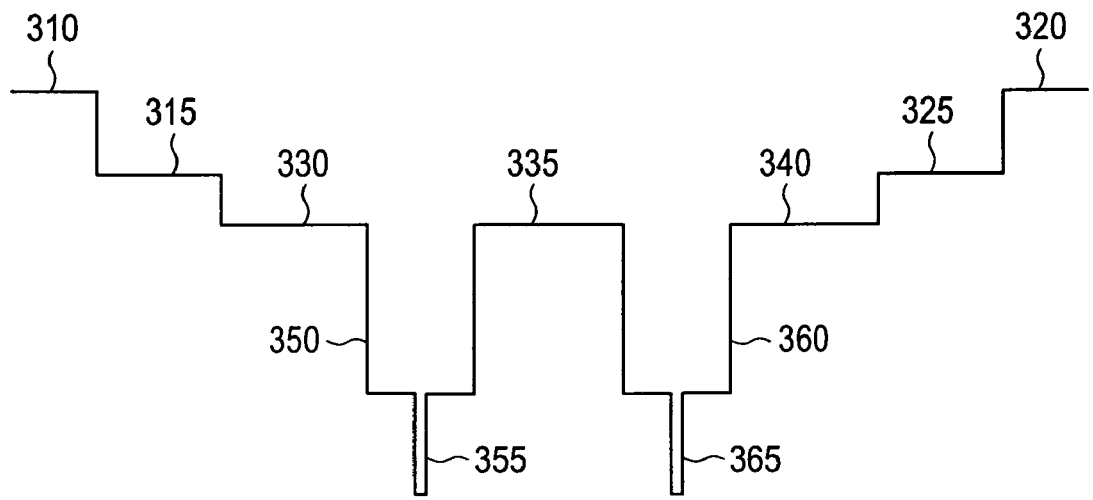
FIG. 3a shows a composition profile for an embodiment in accordance with the invention.

FIG. 3a shows a composition profile similar to that of FIG. 1a in accordance with the invention. GaAs barrier layers 330 and 340 provide the reference energy at the top of $In_yGa_{(1-y)}As$ quantum well layers 350 and 360, respectively. $In_yGa_{(1-y)}As$ quantum well layers 350 and 360 are separated by GaAs barrier layer 335. Embedded, deep, ultra-thin $In_xGa_{(1-x)}As$ quantum well layer 355 is embedded in $In_yGa_{(1-y)}As$ quantum well layer 350 and embedded, deep, ultra-thin $In_xGa_{(1-x)}As$ quantum well layer 365 is embedded in $In_yGa_{(1-y)}As$ quantum well layer 360. The energy levels for AlGaAs layers 310 and 320 and $GaAs_{(1-z)}P_z$ layers 315 and 325 are also shown. Typical doping levels for the non-active layers are typically in the range from about $1 \cdot 10^{17}/cm^3$ to $3 \cdot 10^{18}/cm^3$.

Figure 3B:
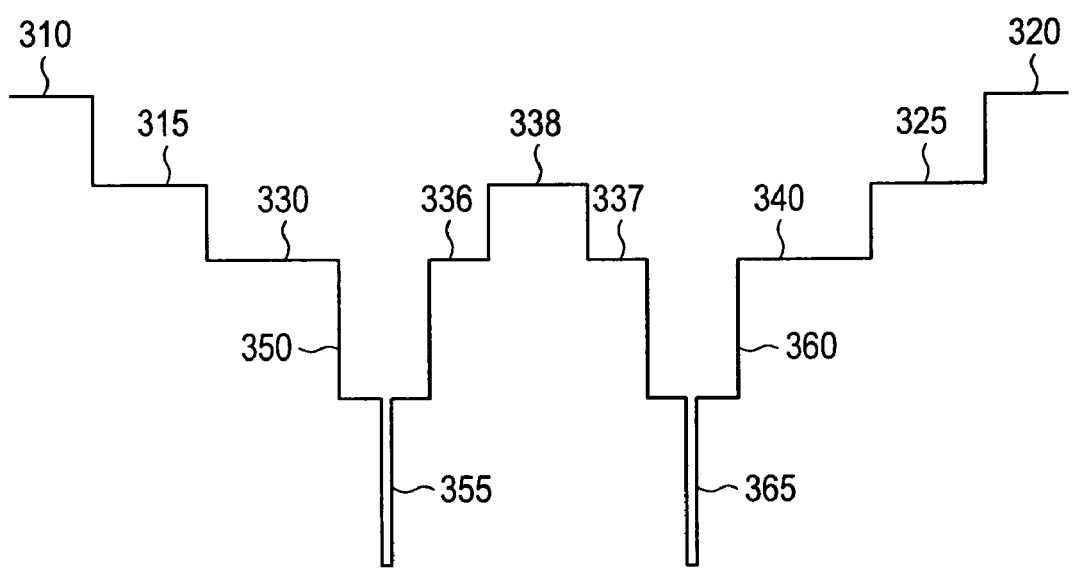
FIG. 3b shows a composition profile for a light modulating semiconductor structure in accordance with the invention.

FIG. 3b is similar to FIG. 3a except that additional strain reducing layer 338 has been introduced. Strain reducing layer 338 is introduced between $In_yGa_{(1-y)}As$ quantum well layers 350 and 360 changing GaAs barrier layer 335 into GaAs barrier layer 336 and GaAs barrier 337.

Figure 3C:
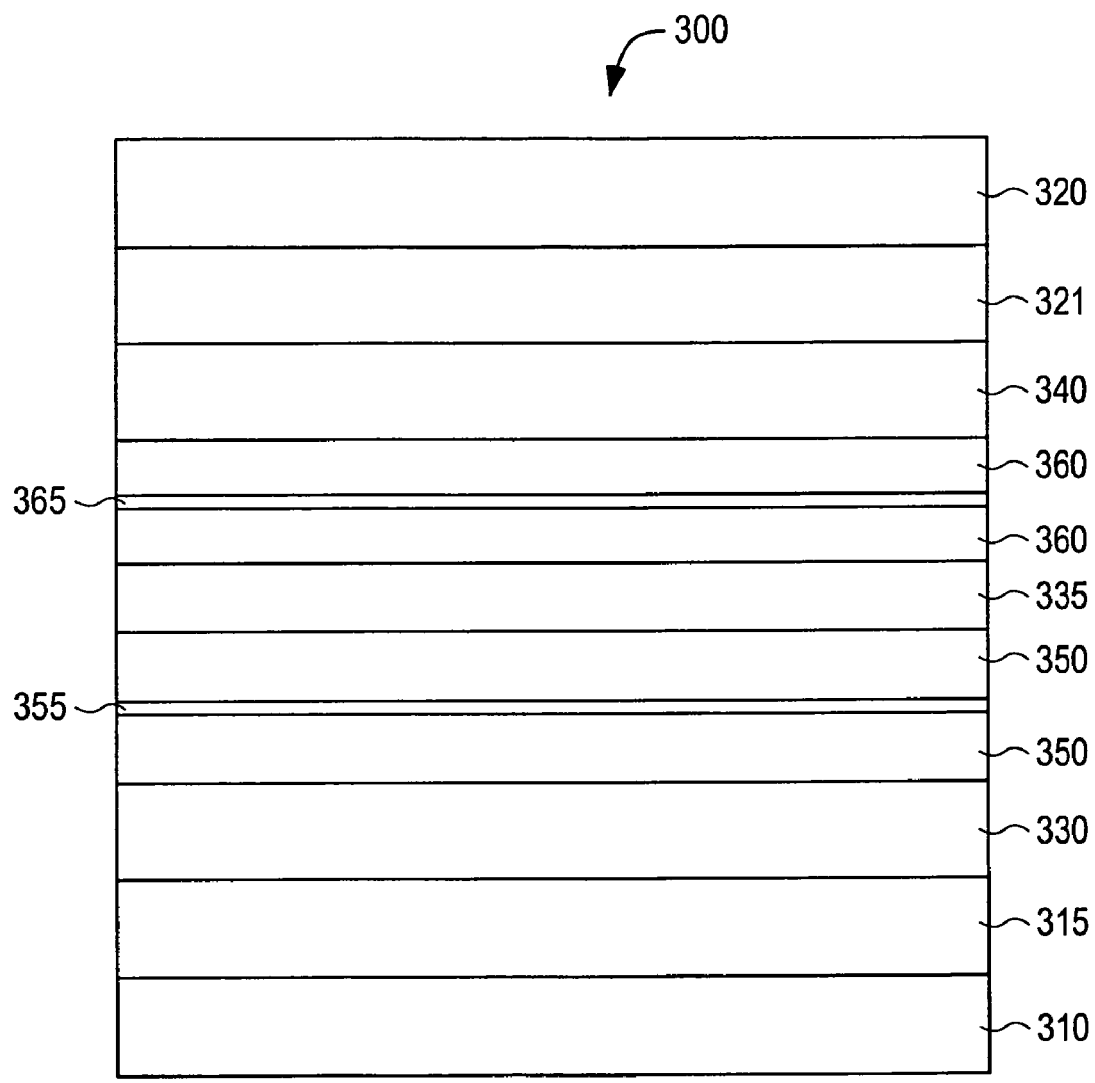
FIG. 3c shows a layer structure corresponding to FIG. 3a in accordance with the invention.

FIG. 3c shows layer structure 300 corresponding to the composition diagram of FIG. 3a. Growth of layer structure 300 is typically by MOCVD in a AIXTRON 2000 reactor at a typical growth temperature in the range from about 400° C. to 600° C., for example, 520° C. at a pressure typically on the order of about 100 mbar. The growth condition for the quantum well layers is typically selected so as to prevent indium segregation. This is typically accomplished by varying the growth rate, growth temperature, and strain of the quantum well layers. After growth of AlGaAs layer 310 for about 25 sec to a typical thickness of about 150 angstrom, $GaAs_{(1-z)}P_z$ layer 315 is grown for about 22 sec to a thickness of about 100 angstrom. $GaAs_{(1-z)}P_z$ layer 315 is a tensile strained layer introduced to minimize the integrated strain on layer structure 300 by acting as a strain compensation layer. $GaAs_{(1-z)}P_z$ layers 315 and 325 typically function to compensate for the increased strain typically introduced by embedded, deep ultra-thin $In_xGa_{(1-x)}As$ quantum well layers 355 and 365. Typical values for z are in the range from about 0.05 to about 0.30

Typically, $GaAs_{(1-z)}P_z$ layers 315 and 325 may be placed at the periphery of $In_yGa_{(1-y)}As$ quantum well layers 350 and 360 respectively, as well as at GaAs barrier layers 330 and 340. Other types of strain compensating layers GaAsN, AlGaAsP, GaInP, InGaAsP, AlInGaAsN may also be used. GaAs barrier layer 330 is grown over $GaAs_{(1-z)}P_z$ layer 315. Growth for GaAs barrier layer 330 typically takes about 16 sec resulting in a typical thickness of about 100 angstrom. $In_yGa_{(1-y)}As$ quantum well layer 350, where y is typically in the range from about 0.3 to 0.45, is grown over GaAs barrier layer 330 for about 4 sec resulting in a typical thickness of about 30 angstrom. Then embedded, deep, ultra-thin $In_xGa_{(1-x)}As$ quantum well layer 355 is embedded in $In_yGa_{(1-y)}As$ quantum well layer 350. The value of x is typically selected to achieve absorption close to 1300 nm in an embodiment in accordance with the invention. A typical 3 sec growth for embedded, deep, ultra-thin $In_xGa_{(1-x)}As$ quantum well layer 355 results in a typical thickness of about 10 angstrom. Growth of $In_yGa_{(1-y)}As$ quantum well layer 350 is then resumed for 4 sec typically resulting in additional thickness of about 30 angstrom. GaAs barrier layer 335 is grown over $In_yGa_{(1-y)}As$ quantum well layer 350. Growth for GaAs barrier layer 335 typically takes about 16 sec resulting in a typical thickness of about 100 angstrom.

$In_yGa_{(1-y)}As$ quantum well layer 360 where y is typically in the range from about 0.3 to 0.45, is grown over GaAs barrier layer 335 for about 4 sec resulting in a typical thickness of about 30 angstrom. Then embedded, deep, ultra-thin $In_xGa_{(1-x)}As$ quantum well layer 365 is embedded in $In_yGa_{(1-y)}As$ quantum well layer 360. A typical 3 sec growth for embedded, deep, ultra-thin $In_xGa_{(1-x)}As$ quantum well layer 365 results in a typical thickness of about 10 angstrom. Growth of $In_yGa_{(1-y)}As$ quantum well layer 360 is then resumed for 4 sec typically resulting in additional thickness of about 30 angstrom. GaAs barrier layer 340 is grown over $In_yGa_{(1-y)}As$ quantum well layer 360. Growth for GaAs barrier layer 340 typically takes about 16 sec resulting in a typical thickness of about 100 angstrom. $GaAs_{(1-z)}P_z$ layer 325 is grown for about 22 sec to a thickness of about 100 angstrom. $GaAs_{(1-z)}P_z$ layer 325 is a tensile strained layer introduced to minimize the integrated strain on layer structure 300 by acting as a strain compensation layer. Other types of strain compensating layers may be used. Then AlGaAs layer 320 is typically grown for about 25 sec to a typical thickness of about 150 angstrom.

Figure 4A:
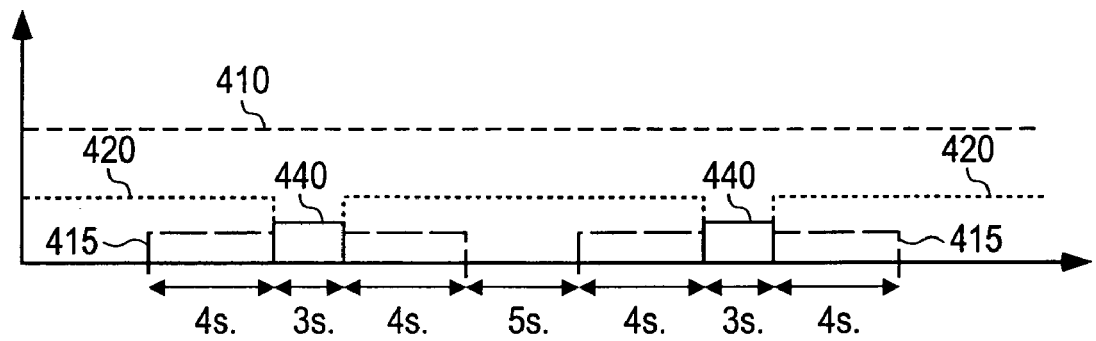
FIGS. 4a-4b show processing time and flow in accordance with the invention.
Figure 4B:
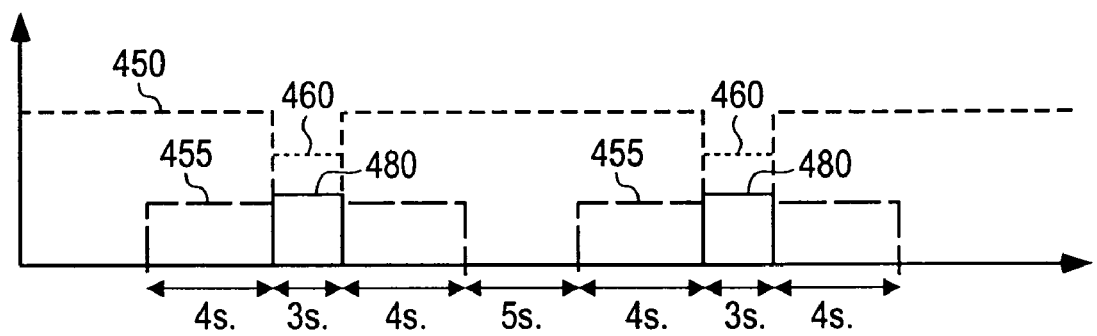

FIGS. 4a and 4b show the relevant gas flows for two growth schemes for $In_yGa_{(1-y)}As$ quantum well layers 350, 360 and embedded, deep, ultra-thin $In_xGa_{(1-x)}As$ quantum well layers 355 and 365 in accordance with the invention. In FIG. 4a, the flow of trimethylgallium 410 and the flow of triethylgallium 420 are initially on. Trimethylindium flow 415 is turned on for about 4 sec to grow the first about 30 angstrom of $In_yGa_{(1-y)}As$ quantum well layer 350. The flow of triethygallium 420 is shut off at the same time as the flow of trimethylindium 415 and the flow of trimethylindium 440 is turned on for about 3 sec to grow embedded, deep, ultra-thin $In_xGa_{(1-x)}As$ quantum well layer 355. When embedded, deep, ultra-thin $In_xGa_{(1-x)}As$ quantum well layer 355 is complete, the flow of triethygallium 420 is turned back on and the flow of trimethylindium 415 is turned on for about another 4 sec to grow the final about 30 angstrom of $In_yGa_{(1-y)}As$ quantum well layer 350. Then GaAs barrier layer 335 is grown for about 5 sec. When growth of GaAs barrier layer 335 is complete, the flow of trimethylindium 415 is turned on for about 4 sec to grow the first about 30 angstrom of $In_yGa_{(1-y)}As$ quantum well layer 360. The flow of triethygallium 420 is shut off at the same time as the flow of trimethylindium 415 and the flow of trimethylindium 440 is turned on for about 3 sec to grow embedded, deep, ultra-thin $In_xGa_{(1-x)}As$ quantum well layer 365. When embedded, deep, ultra-thin $In_xGa_{(1-x)}As$ quantum well layer 365 is complete, the flow of triethygallium 420 is turned back on and the flow of trimethylindium 415 is turned on for about another 4 sec to grow the final about 30 angstrom of $In_yGa_{(1-y)}As$ quantum well layer 360.

In FIG. 4b, the flow of trimethylgallium 450 is initially on. The flow of trimethylindium 455 is turned on for about 4 sec to grow the first about 30 angstrom of $In_yGa_{(1-y)}As$ quantum well layer 350 and is then shut off along with the flow of trimethylgallium 450. The flow of triethylgallium 460 and trimethylindium 480 are then turned on for about 3 sec to grow embedded, deep, ultra-thin $In_xGa_{(1-x)}As$ quantum well layer 355. When embedded, deep, ultra-thin $In_xGa_{(1-x)}As$ quantum well layer 355 is complete, the flow of trimethylgallium 450 is turned on and the flow of trimethylindium 455 is turned on for about 4 sec to grow the final about 30 angstrom of $In_yGa_{(1-y)}As$ quantum well layer 350. Then GaAs barrier layer 335 is grown for about 5 sec. When growth of GaAs barrier layer 335 is complete, the flow of trimethylindium 455 is turned on for about 4 sec to grow the first about 30 angstrom of $In_yGa_{(1-y)}As$ quantum well layer 360 and is then shut off along with the flow of trimethylgallium 450. The flow of triethylgallium 460 and trimethylindium 480 are then turned on for about 3 sec to grow embedded, deep, ultra-thin $In_xGa_{(1-x)}As$ quantum well layer 365. When embedded, deep, ultra-thin $In_xGa_{(1-x)}As$ quantum well layer 365 is complete, the flow of trimethylgallium 450 is turned on and the flow of trimethylindium 455 is turned on for about 4 sec to grow the final about 30 angstrom of $In_yGa_{(1-y)}As$ quantum well layer 350.

Figure 5:
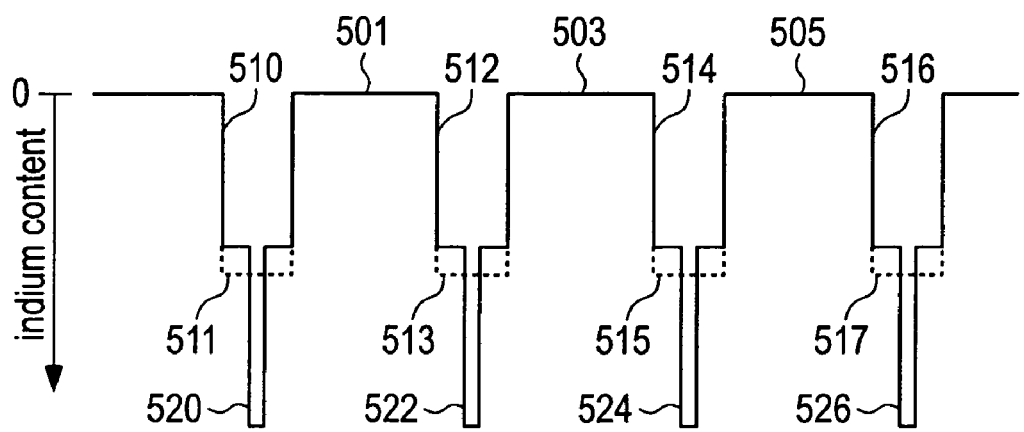
FIG. 5 shows a comparison between composition profiles in accordance with the invention and prior art composition profiles.

In accordance with the invention, deep quantum well layers may be used in other material systems such as InGaAsSb, InP, InGaAsP, AlInGaAs and InGaN. For example, FIG. 5 shows a composition profile for $In_yGa_{(1-y)}N$ multiple quantum well layers 510, 512, 514 and 516 with embedded deep, ultra-thin $In_xGa_{(1-x)}N$ quantum well layers 520, 522, 524 and 526, respectively, in accordance with the invention superimposed over a composition profile for prior art $In_yGa_{(1-y)}N$ multiple quantum well layers 511, 513, 515 and 517. Note that $In_yGa_{(1-y)}N$ multiple quantum well layers 510, 512, 514 and 516 with embedded deep, ultra-thin $In_xGa_{(1-x)}N$ quantum well layers 520, 522, 524 and 526 in accordance with the invention, respectively, are completely analogous to $In_yGa_{(1-y)}As$ quantum well layers 350 and 360 with embedded, deep $In_xGa_{(1-x)}As$ quantum well layers 355 and 365, respectively and separated by GaN barrier layers 501, 503 and 505. $In_yGa_{(1-y)}N$ multiple quantum well layers 511, 513, 515 and 517 typically each have a thickness in the range from about 3nm to about 4 nm. Use of $In_yGa_{(1-y)}N$ multiple quantum well layers 510, 512, 514 and 516 with embedded deep, ultra-thin $In_xGa_{(1-x)}N$ quantum well layers 520, 522, 524 and 526, respectively, allows the indium content of $In_yGa_{(1-y)}N$ multiple quantum well layers 510, 512, 514 and 516 to typically be reduced by several percent. However, typical values for x are typically greater than about 0.5 for embedded deep, ultra-thin $In_xGa_{(1-x)}N$ quantum well layers 520, 522, 524 and 526.

The strong piezoelectric fields present in conventional prior art $In_yGa_{(1-y)}N$ multiple quantum well layers 511, 513, 515 and 517 cause a separation of the electron and hole wavefunctions in conventional prior art $In_yGa_{(1-y)}N$ multiple quantum well layers 511, 513, 515 and 517 which also reduces the quantum well absorption.

In accordance with the invention, electro-absorption modulators may be constructed in InGaAsP material systems with structures analogous to those in InGaAs and InGaN systems. References that discuss relevant InGaAsP material systems include Billia et al., IEEE Photonics Technology Letters, vol. 17, no. 1, pp. 49-51, 2005; Ishikawa et al., IEEE Journal of Quantum Electronics, vol. 30, no. 2, pp. 562-569, 1994; and Minch et al., IEEE Journal of Quantum Electronics, vol. 35, no. 5, pp. 771-782, 1999, all of which are incorporated herein by reference.

Electro-absorption modulators that are strain balanced (resulting in polarization independence) in $In_xGa_{(1-x)}As_yP_{(1-y)}$ material systems for typical telecommunications applications, for example, typically have barrier layers with a bandgap energy between about 1350 nm and about 1400 nm and compositions with a typical value for x of about 0.51 and a typical value for y of about 0.75. The $In_xGa_{(1-x)}As_yP_{(1-y)}$ multiple quantum well layers typically have a bandgap energy of about 1600 nm with a typical value for x of about 0.74 and a typical value for y of about 0.75. The embedded deep, ultrathin, $In_xGa_{(1-x)}As_yP_{(1-y)}$ quantum well layer in each one of the $In_xGa_{(1-x)}As_yP_{(1-y)}$ multiple quantum well layers again acts to lower the bandgap energy of each $In_xGa_{(1-x)}As_yP_{(1-y)}$ multiple quantum well. For example, for a bandgap energy of about 1700 nm and a tensile strain of about 0.4 percent, the value of x is about 0.48 and y is about 1 for each embedded deep, ultrathin, $In_xGa_{(1-x)}As_yP_{(1-y)}$ quantum well layer. For a compressive strain of about 0.5 percent, the value of x is about 0.66 and y is about 0.89 for each embedded deep, ultrathin, $In_xGa_{(1-x)}As_yP_{(1-y)}$ quantum well layer. Note that the arsenic content of the embedded deep, ultrathin, $In_xGa_{(1-x)}As_yP_{(1-y)}$ quantum well layer is higher than that of the InGaAsP quantum well it is embedded in. The indium content for each embedded deep, ultrathin, $In_xGa_{(1-x)}As_yP_{(1-y)}$ quantum well layer on the other hand may be higher or lower in the InGaAsP material system.

Alternatively, in accordance with the invention, electro-absorption modulators may be lattice matched (resulting in polarization dependence) in $In_xGa_{(1-x)}As_yP_{(1-y)}$ material systems for typical telecommunications applications, for example, typically have barrier layers with a bandgap energy between about 1350 nm and about 1400 nm and with compositions having a typical value for x of about 0.69 and a typical value for y of about 0.68. The $In_xGa_{(1-x)}As_yP_{(1-y)}$ multiple quantum well layers typically have a bandgap energy of about 1600 nm with a typical value for x of about 0.61 and a typical value for y of about 0.84. The embedded deep, ultrathin, $In_xGa_{(1-x)}As_yP_{(1-y)}$ quantum well layer in each one of the $In_xGa_{(1-x)}As_yP_{(1-y)}$ multiple quantum well layers again acts to lower the bandgap energy of each $In_xGa_{(1-x)}As_yP_{(1-y)}$ multiple quantum well. For example, for a bandgap energy of about 1700 nm and lattice matched configuration, the value of x is about 0.54 and y is about 0.98 for each embedded deep, ultrathin, $In_xGa_{(1-x)}As_yP_{(1-y)}$ quantum well layer. Note that the arsenic content of the embedded deep, ultrathin, $In_xGa_{(1-x)}As_yP_{(1-y)}$ quantum well layer is higher than that of the InGaAsP quantum well it is embedded in. Note also that lattice matched $In_xGa_{(1-x)}As$ may also be used for the embedded quantum well.

Figure 6:
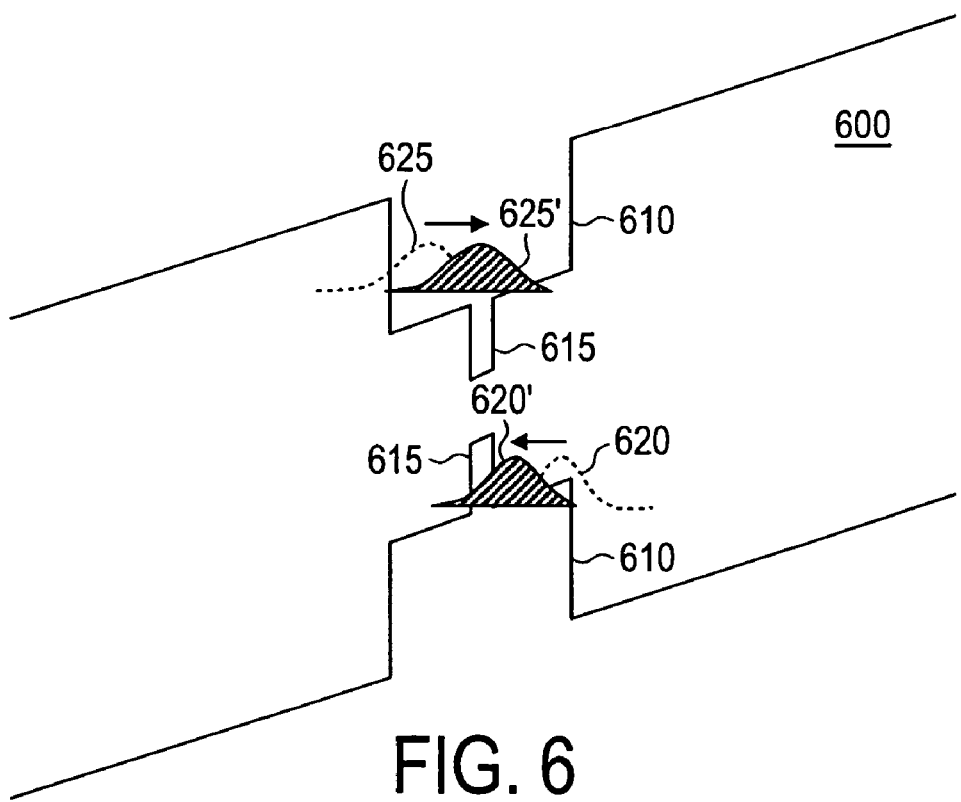
FIG. 6 shows a band diagram for an embodiment in accordance with the invention.

FIG. 6 shows band diagram 600 in accordance with the invention of a deep quantum well electro-absorption modulator structure under reverse bias. In band diagram 600, embedded deep quantum well 615 is centered within conventional quantum well 610. Under reverse bias, the electron wavefunction 625 and hole wavefunction 620 are typically misaligned in the absence of deep quantum well 615. The presence of embedded deep quantum well 615 provides additional confinement that acts to localize the hole and electron distributions toward the center of quantum well 610. Hence, embedded, deep quantum well 615 effectively pulls the holes and electrons from their respective interfaces towards the center of quantum well 610 as shown by shaded electron wavefunction 625' and shaded hole wavefunction 620'. The resulting improvement in spatial overlap between the electron and hole distribution provides greater absorption in quantum well 610. This leads to a greater extinction for an electro-absorption modulator with an embedded, deep quantum well structure.

While the deep-quantum well provides greater absorption, the Stark shift is reduced for a given applied electric field. This is a trade-off associated with the deep quantum well structure in accordance with the invention. However, the deep-quantum well structure affords considerable design freedom as embedded, deep quantum well 615 may be displaced from the center of conventional quantum well 610 to optimize the performance of the deep quantum well electro-absorption modulator. Similarly, the composition and thickness of embedded, deep quantum well 615 may be adjusted to enhance performance. The embedded, deep quantum well structure in accordance with the invention provides an extra degree of freedom for enhancing performance of electro-absorption modulators.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. An electro-absorption modulator comprising:
   a substrate;
   a plurality of semiconductor layers formed on said substrate;
   one of said plurality of semiconductor layers comprising a first quantum well region having a first composition; and
   a second quantum well region having a second composition, said second quantum well region being embedded in said first quantum well region;
   wherein the second quantum well region embedded in the first quantum well region results in an increase in spatial overlap of the hole and electron wave functions;
   wherein the increase in spatial overlap of the hole and electron wave functions increases the quantum well absorption.

2. The structure of claim 1 wherein said second composition has a higher indium content than said first composition.

3. The structure of claim 1 wherein said second composition has a higher arsenic content than said first composition.

4. The structure of claim 1 wherein one of said semiconductor layers is a tensile strained layer.

5. The structure of claim 4 wherein said tensile strained layer is comprised of GaAsP.

6. The structure of claim 1 wherein said second quantum well region comprises indium, gallium and arsenic.

7. The structure of claim 1 wherein said second quantum well region comprises indium, gallium and nitrogen.

8. The structure of claim 1 wherein said second quantum well region comprises indium, gallium and phosphorus.

9. The structure of claim 1 wherein said first quantum well region comprises phosphorus.

10. The structure of claim 1 wherein said first quantum well region comprises antimony.

11. The structure of claim 1 wherein said second quantum well region is embedded substantially in the middle of said first quantum well region.

12. The structure of claim 1 wherein a second bandgap of said second composition is lower in value than a first bandgap of said first composition.

13. A method for an electro-absorption modulator comprising:
    providing a substrate;
    forming a plurality of semiconductor layers on said substrate wherein
    one of said semiconductor layers comprises a first quantum well region having a first composition; and
    embedding a second quantum well region in said first quantum well region, said second quantum well region having a second composition;
    wherein the second quantum well region embedded in the first quantum well region results in an increase in spatial overlap of the hole and electron wave functions;
    wherein the increase in spatial overlap of the hole and electron wave functions increases the quantum well absorption.

14. The method of claim 13 wherein a second bandgap of said second composition is lower in value than a first bandgap of said first composition.

15. The method of claim 13 wherein said second composition has a higher indium content than said first composition.

16. The method of claim 13 wherein said second composition has a higher arsenic content than said first composition.

17. The method of claim 13 wherein said first quantum well region comprises phosphorus.

18. The method of claim 13 wherein said second quantum well region comprises indium, gallium and arsenic.

19. The method of claim 13 wherein said second quantum well region is embedded substantially in the middle of said first quantum well region.

20. The method of claim 13 wherein said second quantum well region comprises indium, gallium and phosphorus.

* * * * *